US012071844B2

United States Patent
Yu et al.

(10) Patent No.: US 12,071,844 B2
(45) Date of Patent: Aug. 27, 2024

(54) MULTI-AGENT DRILLING DECISION SYSTEM AND METHOD

(71) Applicant: Schlumberger Technology Corporation, Sugar Land, TX (US)

(72) Inventors: Yingwei Yu, Katy, TX (US); Richard John Meehan, Houston, TX (US); Cheolkyun Jeong, Katy, TX (US); Velizar Vesselinov, Katy, TX (US); Wei Chen, Katy, TX (US); Yuelin Shen, Katy, TX (US); Minh Trang Chau, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 131 days.

(21) Appl. No.: 17/177,897

(22) Filed: Feb. 17, 2021

(65) Prior Publication Data
US 2022/0145745 A1 May 12, 2022

Related U.S. Application Data

(60) Provisional application No. 63/198,773, filed on Nov. 12, 2020.

(51) Int. Cl.
*E21B 44/00* (2006.01)
*E21B 47/026* (2006.01)
(Continued)

(52) U.S. Cl.
CPC ............ *E21B 44/00* (2013.01); *E21B 47/026* (2013.01); *E21B 49/003* (2013.01);
(Continued)

(58) Field of Classification Search
CPC ...... E21B 44/00; E21B 47/026; E21B 49/003; E21B 49/0875; E21B 2200/20; E21B 2200/22; E21B 49/087; E21B 33/00
(Continued)

(56) References Cited

U.S. PATENT DOCUMENTS 6,438,495 B1  8/2002  Chau et al.
6,612,382 B2 *  9/2003  King ..................... E21B 44/005
702/9
(Continued)

FOREIGN PATENT DOCUMENTS

EP  1335108 A2  8/2003
WO  2010101473 A1  9/2010
(Continued)

OTHER PUBLICATIONS

Ahmed Hamza, Mohamed Shamlooh, Ibnelwaleed A. Hussein, Mustafa Nasser, Saeed Salehi, Polymeric formulations used for loss circulation materials and wellbore strengthening applications in oil and gas wells: A review, Journal of Petroleum Science and Engineering, vol. 180, 2019, pp. 197-214 (Year: 2019).*

(Continued)

*Primary Examiner* — Brian S Cook (74) *Attorney, Agent, or Firm* — Aashish Y. Chawla (57) ABSTRACT

A method for drilling a well includes generating a plurality of proposed drilling actions using a plurality of working agents based on a working environment, simulating drilling responses to the proposed drilling actions using a plurality of validation agents in a validation environment that initially represents the working environment, determining rewards for the proposed drilling actions based on the simulating, using the validation agents, selecting one of the proposed drilling actions, and causing a drilling rig to execute the selected one of the proposed actions.

21 Claims, 7 Drawing Sheets

(51) Int. Cl.
*E21B 49/00* (2006.01)
*E21B 49/08* (2006.01)

(52) U.S. Cl.
CPC ...... *E21B 49/0875* (2020.05); *E21B 2200/20* (2020.05); *E21B 2200/22* (2020.05)

(58) Field of Classification Search
USPC .......................................................... 703/10
See application file for complete search history.

(56) References Cited

U.S. PATENT DOCUMENTS

| | | | |
|---|---|---|---|
| 6,968,909 B2 | 11/2005 | Aldred et al. | |
| 7,085,696 B2 | 8/2006 | King | |
| 9,482,055 B2 * | 11/2016 | Huang | E21B 10/16 |
| 10,221,671 B1 | 3/2019 | Zhang | |
| 11,396,804 B2 * | 7/2022 | Madasu | E21B 44/00 |
| 2006/0272861 A1 | 12/2006 | Hutchinson | |
| 2013/0127900 A1 * | 5/2013 | Pena | G06F 11/324 |
| | | | 345/619 |
| 2019/0048706 A1 | 2/2019 | Benson et al. | |
| 2019/0048707 A1 | 2/2019 | Benson et al. | |
| 2019/0145240 A1 | 5/2019 | Benson et al. | |
| 2020/0157887 A1 * | 5/2020 | Alonso | E21B 43/30 |
| 2020/0370409 A1 | 11/2020 | Yu et al. | |

FOREIGN PATENT DOCUMENTS

| | | | | |
|---|---|---|---|---|
| WO | WO-2016022388 A1 * | 2/2016 | ........... | E21B 44/005 |
| WO | 2016154723 A1 | 10/2016 | | |
| WO | 2020028298 A1 | 2/2020 | | |
| WO | 2020046351 A1 | 3/2020 | | |
| WO | 2020172447 A1 | 8/2020 | | |

OTHER PUBLICATIONS

Cayeux, Eric , Daireaux, Benoît, and Erik Wolden Dvergsnes. "Automation of Drawworks and Topdrive Management To Minimize Swab/Surge and Poor-Downhole-Condition Effects." SPE Drill & Compl 26 (2011): 557-568. doi: https://doi.org/10.2118/128286-PA (Year: 2011).*

Hegde, Chiranth , Wallace, Scott , and Ken Gray. "Real Time Prediction and Classification of Torque and Drag During Drilling Using Statistical Learning Methods." Paper presented at the SPE Eastern Regional Meeting, Morgantown, West Virginia, USA, Oct. 2015. doi: https://doi.org/10.2118/177313-MS (Year: 2015).*

Tompkins_2003 (Optimization Techniques for Task Allocation and Scheduling in Distributed Multi-Agent Operations, Jun. 2003). (Year: 2003).*

Pollock et. al., "Machine Learning for Improved Directional Drilling," Offshore Technology Conference held in Houston, TX USA, Apr. 30-May 3, 2018.

Mnih et al., "Human-level control through deep reinforcement learning," Nature vol. 518, pp. 529, Feb. 26, 2015.

Mnih et. Al., "Asynchronous Methods for Deep Reinforcement learning," Proceedings of the 33rd International Conference on Machine Learning, New York, NY, USA, 2016.

OpenAI, "Learning Dexterity," retrieved at https://blog.openai.com/learning-dexterity/ on Jan. 27, 2020.

DeepMind, "Safety-first AI for autonomous data centre cooling and industrial control," retrieved at https://deepmind.com/blog/safety-first-ai-autonomous-data-centre-cooling-and-industrial-control/ on Jan. 27, 2020.

Yu et al., Approaches to Directional Drilling Using Machine Learning, Provisional Patent application filed May 21, 2019 (U.S. Appl. No. 62/850,865).

Liu et al. A Reinforcement Learning Based 3D Guided Drilling Method: Beyond Ground Control. In Proceedings of the 2018 VII International Conference on Network, Communication and Computing (ICNCC 2018). Association for Computing Machinery, New York, NY, USA, pp. 44-48.

Kim et al. Recent Advances in Multi-agent Reinforcement Learning. Communications of the Korean Institute of Information Scientists and Engineers. Nov. 2019, vol. 37, No. 11, pp. 8-17.

Lashari, S. et al., "Drilling performance monitoring and optimization: a data-driven approach", Journal of Petroleum Exploration and Production Technology, 2019, 9(4), pp. 2747-2756.

* cited by examiner

MULTI-AGENT DRILLING DECISION SYSTEM AND METHOD

CROSS-REFERENCE TO RELATED APPLICATIONS

This application claims priority to U.S. Provisional Patent Application having Ser. No. 63/198,773, which was filed on Nov. 12, 2020 and is incorporated herein by reference in its entirety.

BACKGROUND

Wells are generally drilled into the earth along a planned trajectory. The trajectory may be selected to minimize risk and/or maximize reward, e.g., to produce an efficient drilling process given the physical constraints of the equipment, geology, etc. During such planning and/or during drilling in response to feedback from sensors, the possibility of failure may be calculated. Further, a higher level of granularity for such risk calculation may be accomplished, e.g., by reviewing the risk associated for any action at a given state along the wellbore during the drilling process. Such risk can be determined using machine learning, e.g., deep learning neural networks that may implement a deep Q-learning (DQN). However, there is a tendency for the models to overstate the Q value associated with different actions along the wellbore at certain points. For example, high dimension of state, limited training, non-linearities/discontinuities in the decision space (butterfly effect), and sensitivity in some specific states can result in a high Q-value.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the disclosure include a method for drilling a well that includes generating a plurality of proposed drilling actions using a plurality of working agents based on a working environment, simulating drilling responses to the proposed drilling actions using a plurality of validation agents in a validation environment that initially represents the working environment, determining rewards for the proposed drilling actions based on the simulating, using the validation agents, selecting one of the proposed drilling actions, and causing a drilling rig to execute the selected one of the proposed actions.

Embodiments of the disclosure include a non-transitory computer-readable medium storing instructions that, when executed by at least one processor of a computing system, cause the computing system to perform operations. The operations include generating a plurality of proposed drilling actions using a plurality of working agents based on a working environment, simulating drilling responses to the proposed drilling actions using a plurality of validation agents in a validation environment that initially represents the working environment, determining rewards for the proposed drilling actions based on the simulating, using the validation agents, selecting one of the proposed drilling actions, and causing a drilling rig to execute the selected one of the proposed actions.

Embodiments of the disclosure include a computing system including one or more processors, and a memory system including one or more non-transitory computer-readable media storing instructions that, when executed by at least one of the one or more processors, cause the computing system to perform operations. The operations include generating a plurality of proposed drilling actions using a plurality of working agents based on a working environment, receiving a manual proposed drilling action from a human user, simulating drilling responses to the proposed drilling actions and the manual proposed drilling action using a plurality of validation agents in a validation environment that initially represents the working environment, determining rewards for the proposed drilling actions and the manual proposed drilling action based on the simulating, using the validation agents, selecting one of the proposed drilling actions or the manual proposed drilling action, selecting the one of the proposed actions is based on the rewards for the proposed actions, and causing a drilling rig to execute the selected one of the proposed actions.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
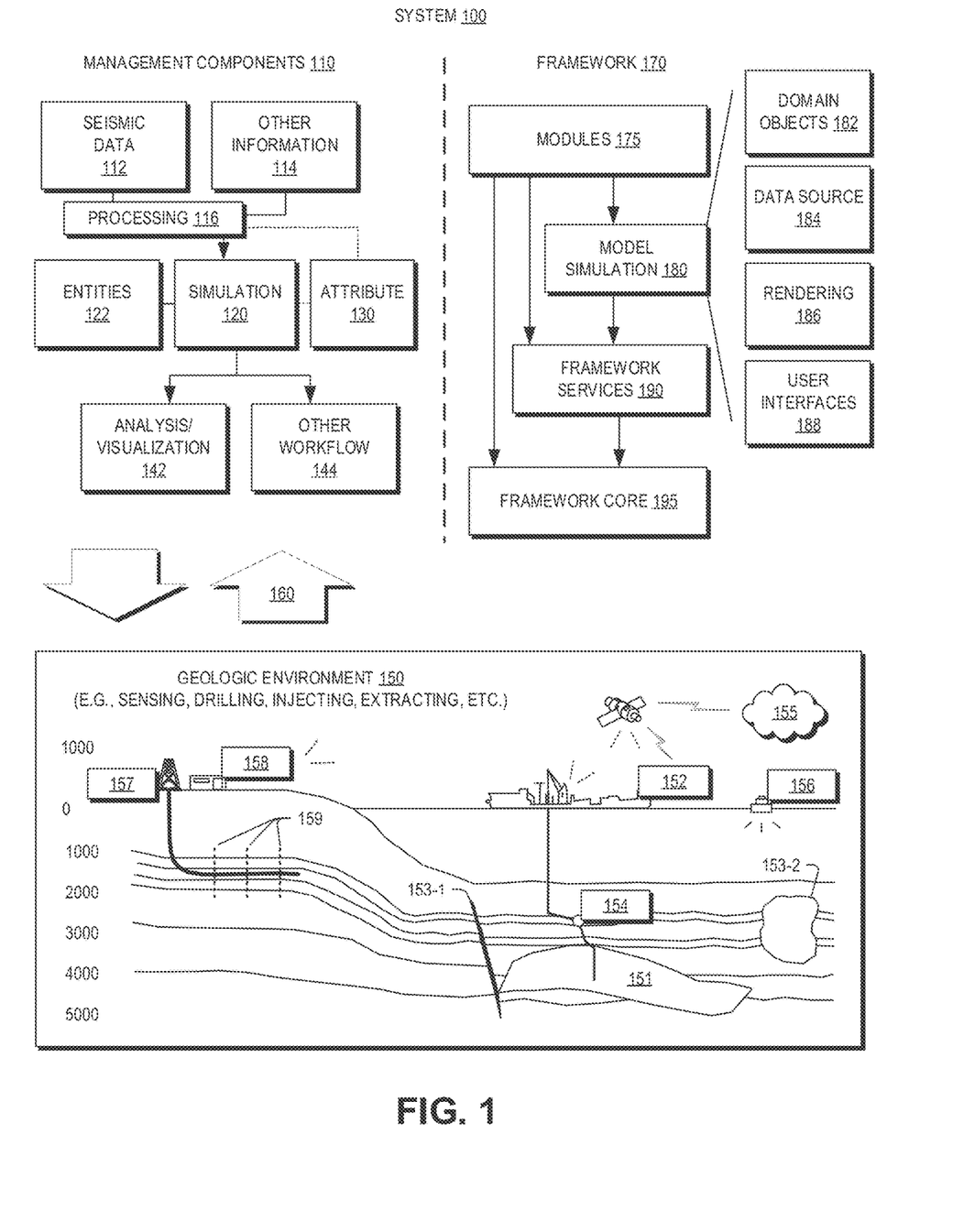
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results, and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures), or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
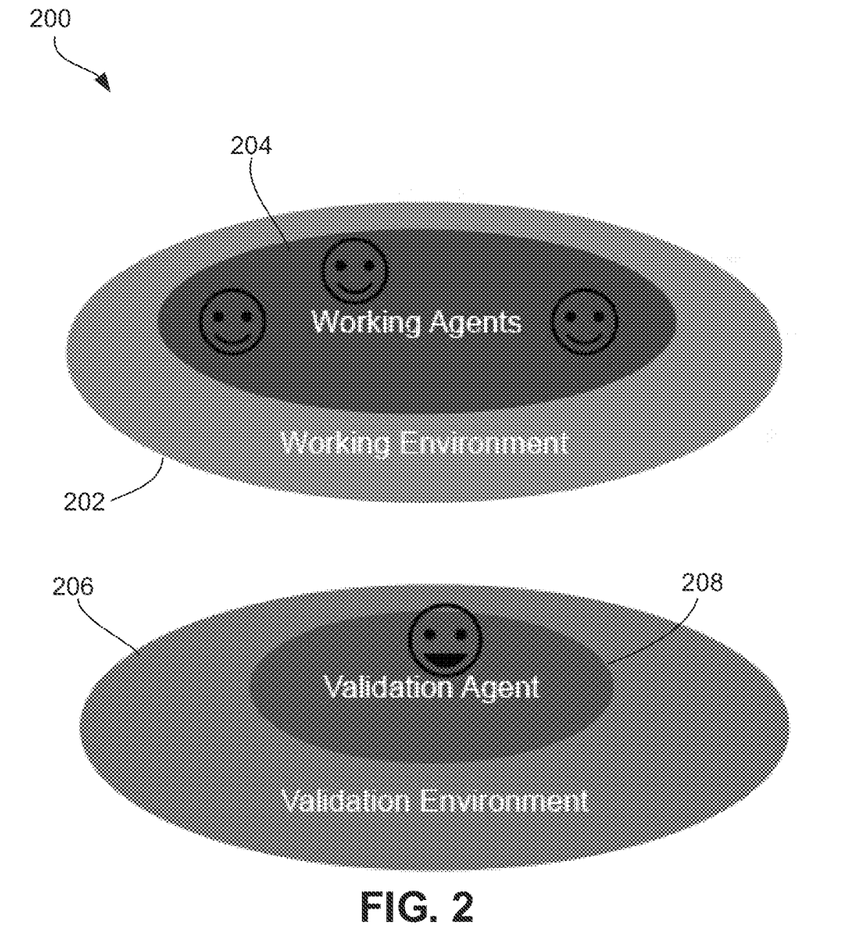
FIG. 2 illustrates a conceptual view of a system for calculating risk of failure in a wellbore environment, e.g., during or prior to drilling, according to an embodiment.

FIG. 2 illustrates a conceptual view of a system 200 for calculating risk of failure in a wellbore environment, e.g., during or prior to drilling, according to an embodiment. The system 200 may include a working environment 202 that includes a pool of working agents 204, e.g., homogenous agents and heterogeneous agents. In this context, an "environment" is an algorithmic component in a reinforcement learning framework. It includes a simulator (or real plant, e.g., an actual field system) where an action may be applied, and a reward system for evaluating the response to this action. The working environment 202 may also include a representation of the current drilling operations, e.g., rig state, geology, bit location (e.g., with respect to the planned trajectory), etc. The system 200 may also include a validation environment 206 having one or more validation agents 208. It will be appreciated that "agents" refers to computer-implemented software and/or hardware or parts thereof.

In some embodiments, the system 200 may calculate risk of failure for an action. The action may be proposed by the working agents 204 in the working environment 202, and the risk may be calculated in the validation environment 206. In some embodiments, the risk may be calculated using a DQN to evaluate the following relationship:

$$Q^\pi(s_t,a_t) = \underline{E}(R_{t+1} + \gamma R_{t+2} + \gamma^2 R_{t+3} + \ldots | s_t, a_t]$$

Figure 3:
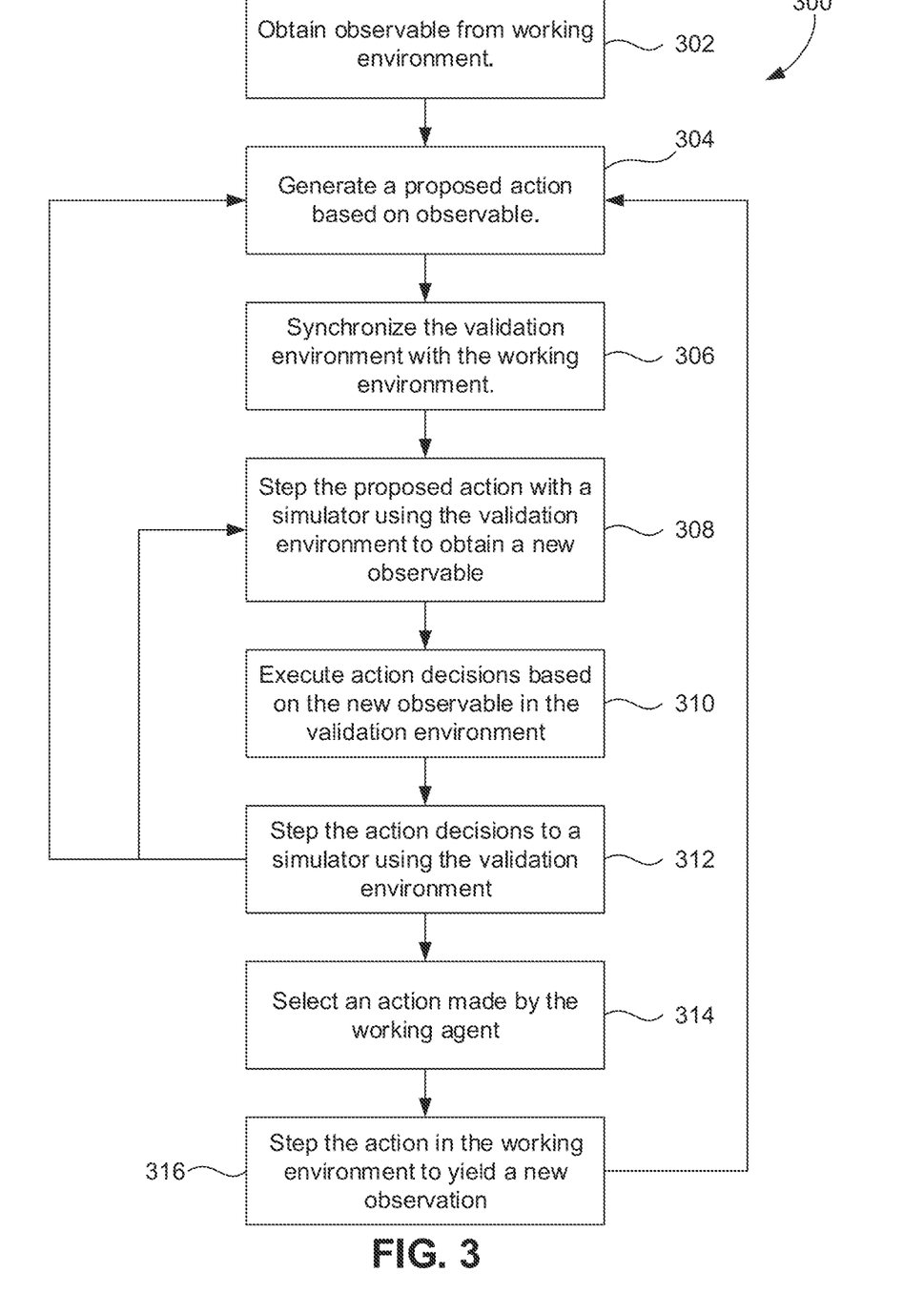
FIG. 3 illustrates a flowchart of a method for calculating risk of failure in a wellbore environment, according to an embodiment.

FIG. 3 illustrates a flowchart of a method 300 for calculating risk of failure while drilling a well, according to an embodiment. The method 300 may include receiving an observable from the working environment, as at 302. An observable may be a state observed from an environment, such as a survey point during drilling. The observable event may be the survey carried out in the field. In other embodiments, observables may be anything that may call for a drilling action in response.

As noted above, the working environment 202 may include multiple working agents 204. Each working agent 204 may be employed by the method 300 to generate a proposed action based on (e.g., in response to) the observable, as at 304. Proposed actions may include adjustments to toolface settings, sliding ratios, and/or other drilling parameters. The method 300 may then include synchronizing the validation environment 208 with the working environment 202, so that the validation environment 208 accurately represents the current state of the drilling environment 202, e.g., the position, operating parameters, and/or state of drilling equipment, the formation properties, etc.

The method 300 may then include stepping the proposed action with a simulator, in the validation environment 208, so as to yield a new observable, as at 308. Thus, after stepping the simulation, the validation environment 208 represents the drilling environment in a hypothetical case in which the proposed action has been implemented. The validation agent 206 may then execute action decisions on the new observable in the validation environment 206, as at 310. The validation environment 206 may then step the action decided upon by the validation agent 206 in the simulator, as at 312. The worksteps of proposing action, making decisions, and stepping in the simulator may then be repeated, e.g., until the validation agent 208 finishes a drilling analysis, e.g., until the validation environment, executing the different steps, reaches a target location. From this analysis, the method 300 may include calculating a reward using the validation agent 208. The preceding aspects may then be repeated for the remaining working agents and the actions proposed by these other working agents, if any, as indicated in FIG. 3.

The method 300 may then select an action proposed by one of the working agents 204 based on the reward, as at 314. For example, the method 300 may include selecting a proposed action that yields the maximum reward (R) according to the drilling analysis performed by the validation agent. The action that is selected may then be returned to the working environment 204, as at 316. For example, a drilling rig may be adjusted to implement the action. The process of acquiring working agent decision steps for a remainder of the drilling may then repeat, based on the new observation obtained. This may repeat, e.g., throughout the drilling process.

Figure 4:
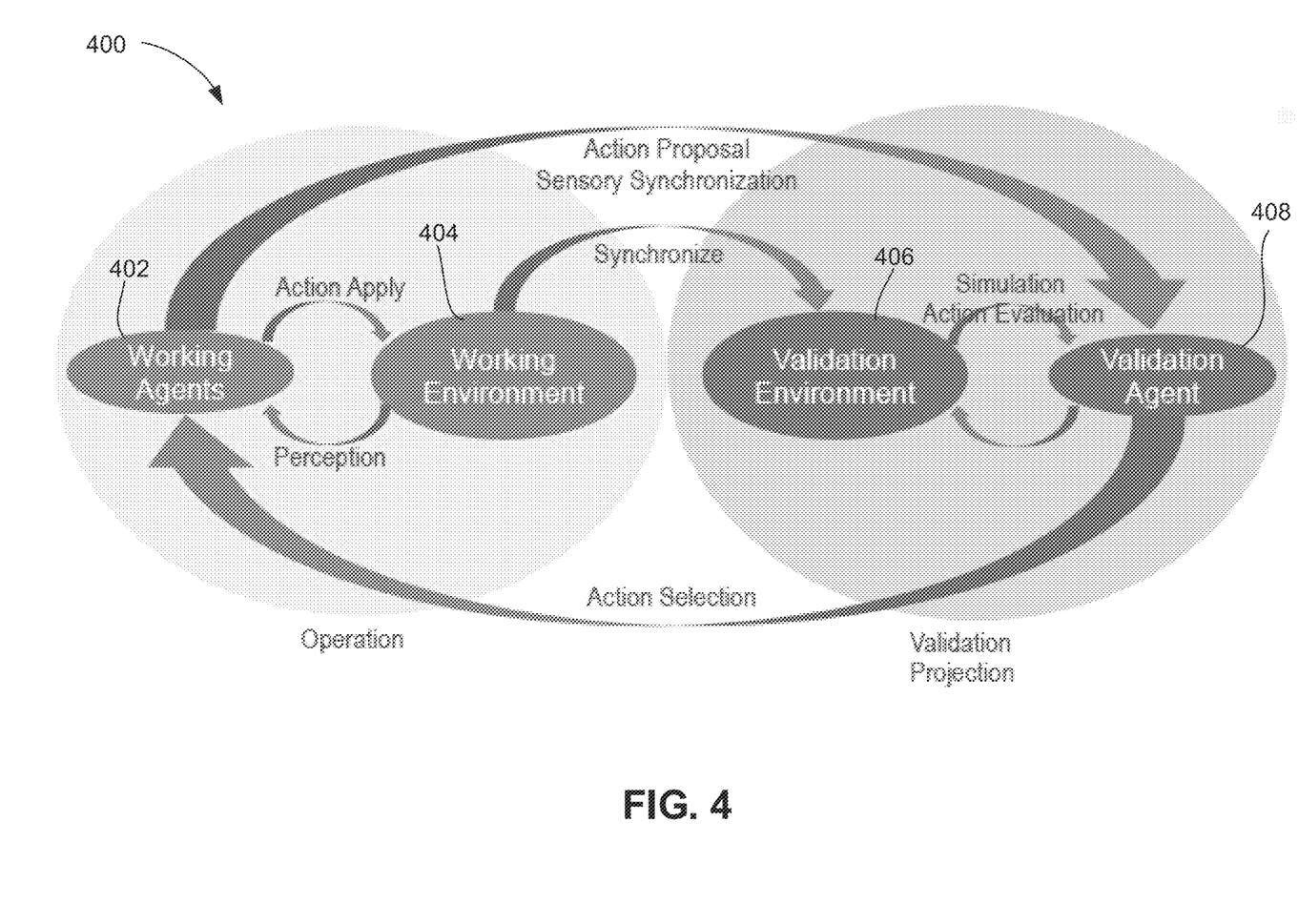
FIG. 4 illustrates an example of an architecture for the system implementing the method, according to an embodiment.

FIG. 4 illustrates an example of an architecture for a system 400 implementing the method 300, according to an embodiment. As shown, the working agents 402 and working environment 404 may be part of an "operation" side of the architecture, while a validation projection side of the architecture may include the validation environment 406 and the validation agent 408.

The working agents 402, working environment 404, validation environment 406, and validation agent 408 interact. In particular, the working agents 402 may apply actions to the working environment 404, and receive perceptions (e.g., sensor measurements) therefrom, e.g., a state of the working environment 404. The working environment 404 may synchronize with the validation environment 406. The validation environment 406 may evaluate actions by way of simulation through the validation agent 408, which may provide results of the simulation back to the validation environment 406. Further, the working agents 404 may provide action proposal sensory synchronization to the validation agent 408, which may provide action selections back to the working agents 404. The action may then be fed to the working environment 406, which may, for example, cause a drilling rig to implement the selected drilling action.

Embodiments of the method 300 can implement the validation agent 408 to run multiple times, potentially in different configurations, for a single action proposed by one or more working agents 404. For example, the validation agent 408 can be configured to prioritize efficiency in the drilling process, or minimization of risk, to name just two examples of different possible configurations for the validation agent 408. Further, in at least some examples, two or more different (and differently configured) validation agents 408 may be provided and may be used to perform the drilling analysis separately, e.g., in parallel, to generate a reward associated with an action proposed by one or more of the working agents 402. In some embodiments, the highest total reward may be used, but in others, the average total reward or lowest total reward may be used. The reward calculated, e.g., in one of these ways, may then be compared with the rewards, calculated the same or similarly, for other proposed actions, thereby permitting the machine-generated proposed actions to be quantitatively compared and automatically selected.

Further, by providing interaction between working agents 402 and validation agents 408, passing proposals and selections back and forth, more stable decision making may result, because agreement between working agent 402 and validation agent 408 may prevent irrational choices by either. Additionally, the validation agent 408 may present an empirical evaluation through simulation.

Figure 5:
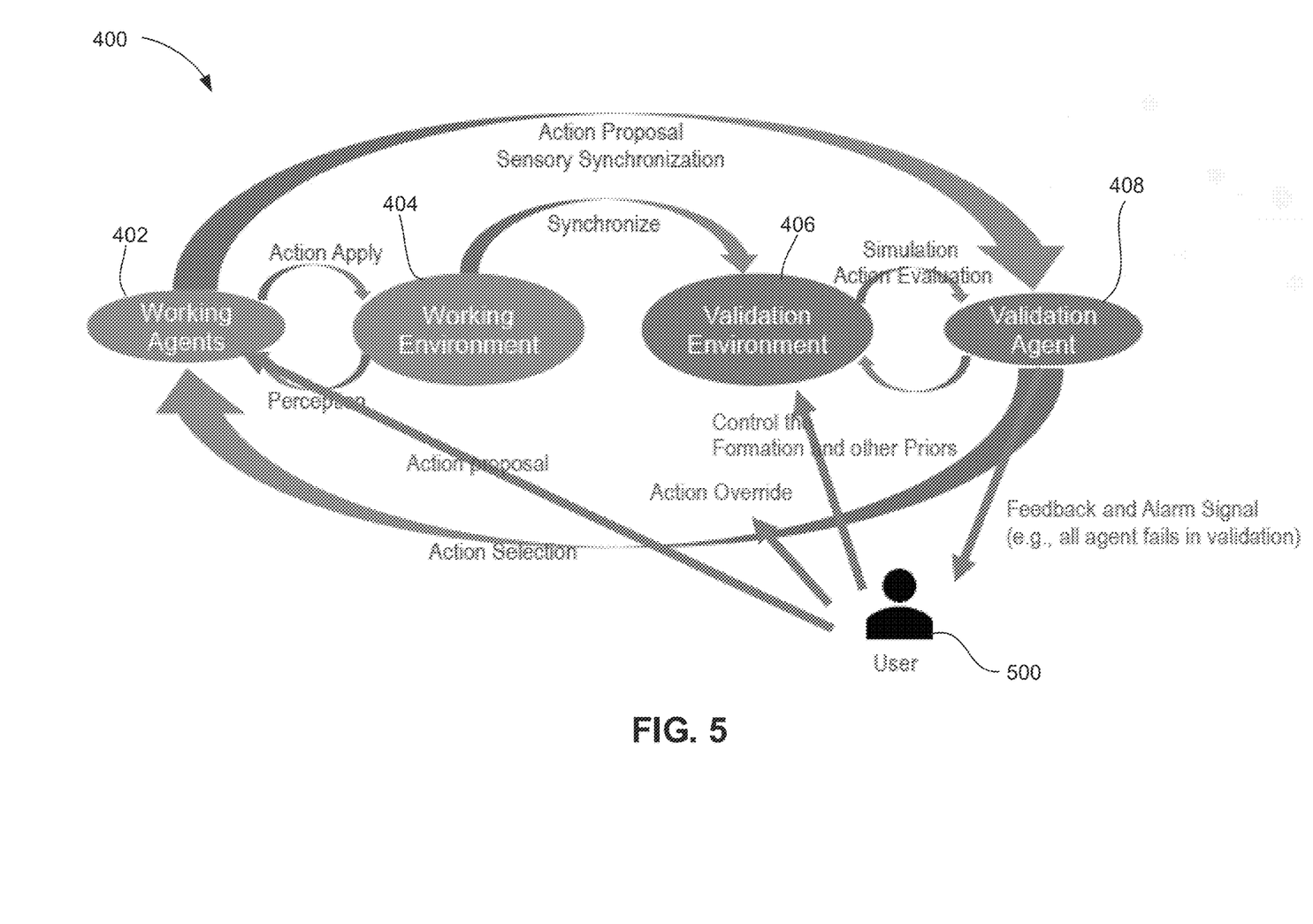
FIG. 5 illustrates an example of interaction between the system and a user, according to an embodiment.

FIG. 5 illustrates an example of the interaction between the system 400 and a human user 500, according to an embodiment. As shown, the user 500 may have input into the working agents 402, the action selection, and the validation environment 406. For example, the user 500 may provide an action proposal, which may be added to the actions proposed by the working agents 402, and may compete therewith in the drilling analysis conducted by the validation agent 408. The user may also override the action selected by the validation agent 408. The user may also control the formation and/or any other characteristic of the validation environment, e.g., based on offset well data and/or experience. The validation agent 408 may also provide feedback and alarm signals (e.g., failure of the drilling actions proposed by the working agents 402 to produce a viable well) to the user 500, so the user 500 may take mitigating actions. As such, the system 400 may provide environmental detection, etc., and may be able to perform most tasks autonomously, but human feedback/override may still be available.

Figure 6:
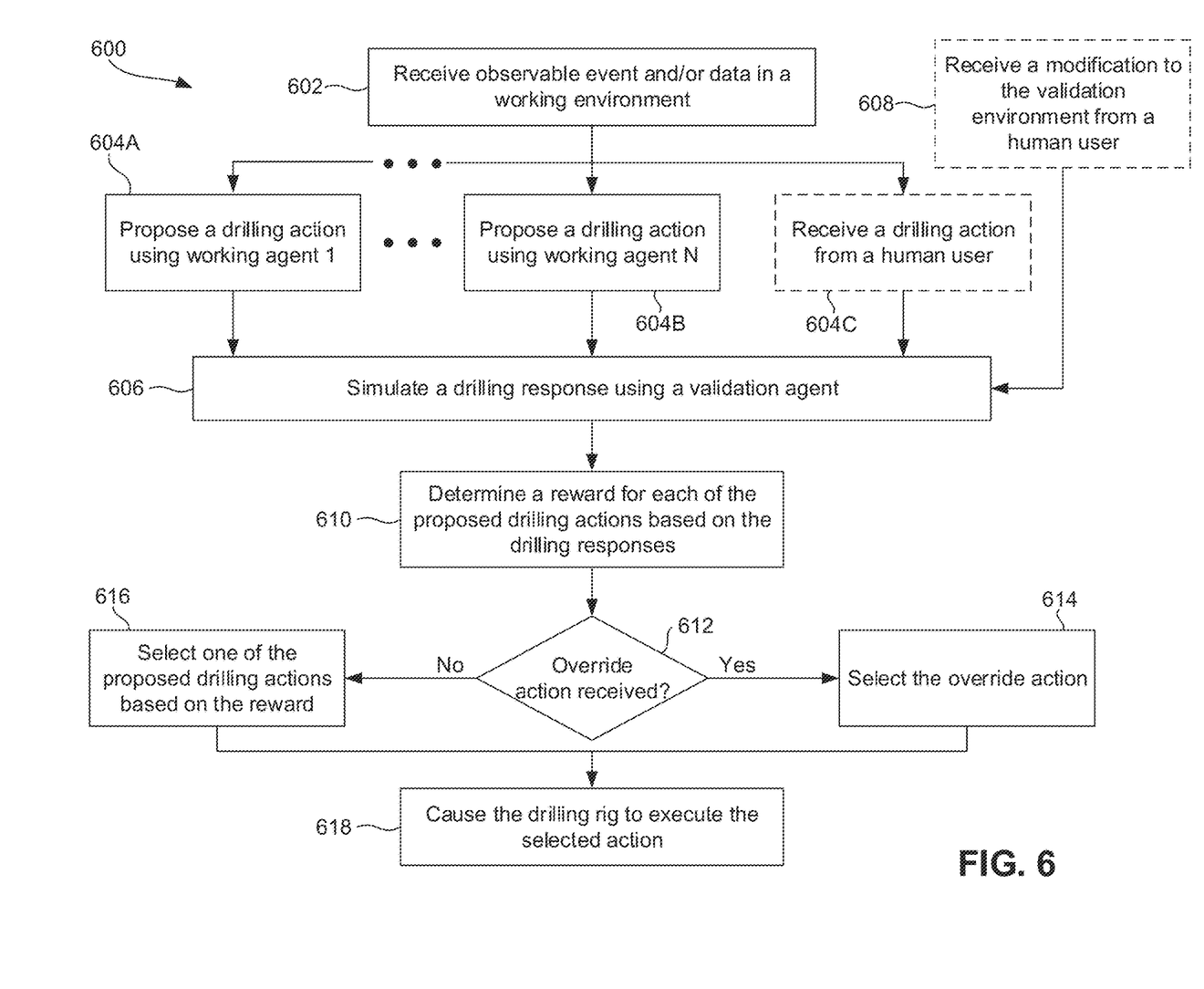
FIG. 6 illustrates a flowchart of a method for drilling, according to an embodiment.

FIG. 6 illustrates another method 600 for drilling, according to an embodiment. As with the method 400 of FIG. 4, the present embodiment may implement a bifurcated architecture in which working agents may make proposals for drilling actions and one or more validation agents may evaluate these proposals in a validation environment. Moreover, the method 600 may be subject to human intervention and/or override, as will be described.

As shown, the method 600 may include receiving an observable event and/or data in a working environment, as at 602. For example, the observable may include one or more sensor measurements representing, for example, a position of a drill bit in the earth, and a comparison thereof to a planned trajectory.

The method 600 may then include proposing a drilling action using potentially several (e.g., 1, 2, . . . , N) working agents, as at 604A, 604B. Each working agent may be configured to interpret data differently, e.g., may be tuned for different types of environments, may implement rules-based algorithms, different machine-learning models (e.g., of different types or trained using different data specific to different situations).

In some embodiments, the method 600 may also include receiving a drilling action proposed by a human user, as at 604C. This drilling action, which may be based on intuition, field experience, etc. may be used as a competitive drilling action proposal, and may be evaluated alongside the machine-generated proposals.

One or more validation agents may then simulate drilling responses for the actions proposed by the working agents, as at 606. In some embodiments, one validation agent may evaluate the drilling proposals from each of the working agents. In other embodiments, different validation agents may evaluate drilling actions from different working agents. For example, a different validation agent may be used for each different working agent, or there may be overlap between the drilling proposals evaluated by the different validation agents. Thus, any combination of working agents and validation agents may be provided. In a specific embodiment, several validation agents may be used, e.g., tuned to prioritize different goals, e.g., one may be tuned for efficiency, another for speed, another for risk, another for maintaining strict adherence to a planned trajectory, etc.

In some embodiments, the validation environment, e.g., drilling parameters, geological characteristics of the subsurface domain, etc., may be modified by a user before or during the simulating at 606. For example, the method 600 may include receiving a modification to the validation environment from a human user, as at 608. The validation agents may then use the modified validation environment in order to evaluate the proposed drilling actions, which may or may not include a human-proposed drilling action.

Using the validation agent(s), the method 600 may include determining a reward for each of the proposed drilling actions based on the drilling responses calculated using the validation environment, as at 610. For example, the validation agents may simulate a drilling scenario for each of the proposed actions, determining the risk of each resulting in failure, the efficiency in the drilling process, etc. The calculation of the drilling scenario may be accomplished solely by the validation agents running through the simulation of the entire scenario, or could be accomplished by recursively pushing incremental drilling responses back to the working environment, for the working agents to then propose next actions, until the end of the drilling scenario is reached. In an embodiment, the working agents propose a set of actions, and each action is individually evaluated by the validation agent in the validation environments. When the validation agent evaluate, a projected total future reward score, or estimated total reward (ETR), is calculated for each action. The final action is the one with the maximum ETR.

In some embodiments, the reward may be a quantification of a risk of failure for a given action, e.g., the DQN equation provided above. In other embodiments, other quantifications of a reward for a proposed action may be employed. The rewards may be different as calculated between different validation agents, and thus may be combined, e.g., using an average, taking a minimum/maximum, or using any other statistical method.

The method 600 may again account for human intervention, e.g., in the form of an override. Accordingly, at 612, the method 600 may provide an opportunity for a manual override of the proposed actions, e.g., in which a human operate selects an action notwithstanding, or at least not strictly adhering to, the rewards calculation by the validation agents. If an override is received (612: Yes), the override is selected, as at 614. Otherwise (612: No), the method 600 may include selecting one of the proposed drilling actions (either a computer-generated or user-entered action) based on the calculated reward, as at 616. The method 600 may then feed the selected drilling action back to the working agent, which may cause the working environment to be manipulated, e.g., by causing the drilling rig to execute the selected action, as at 618.

Figure 7:
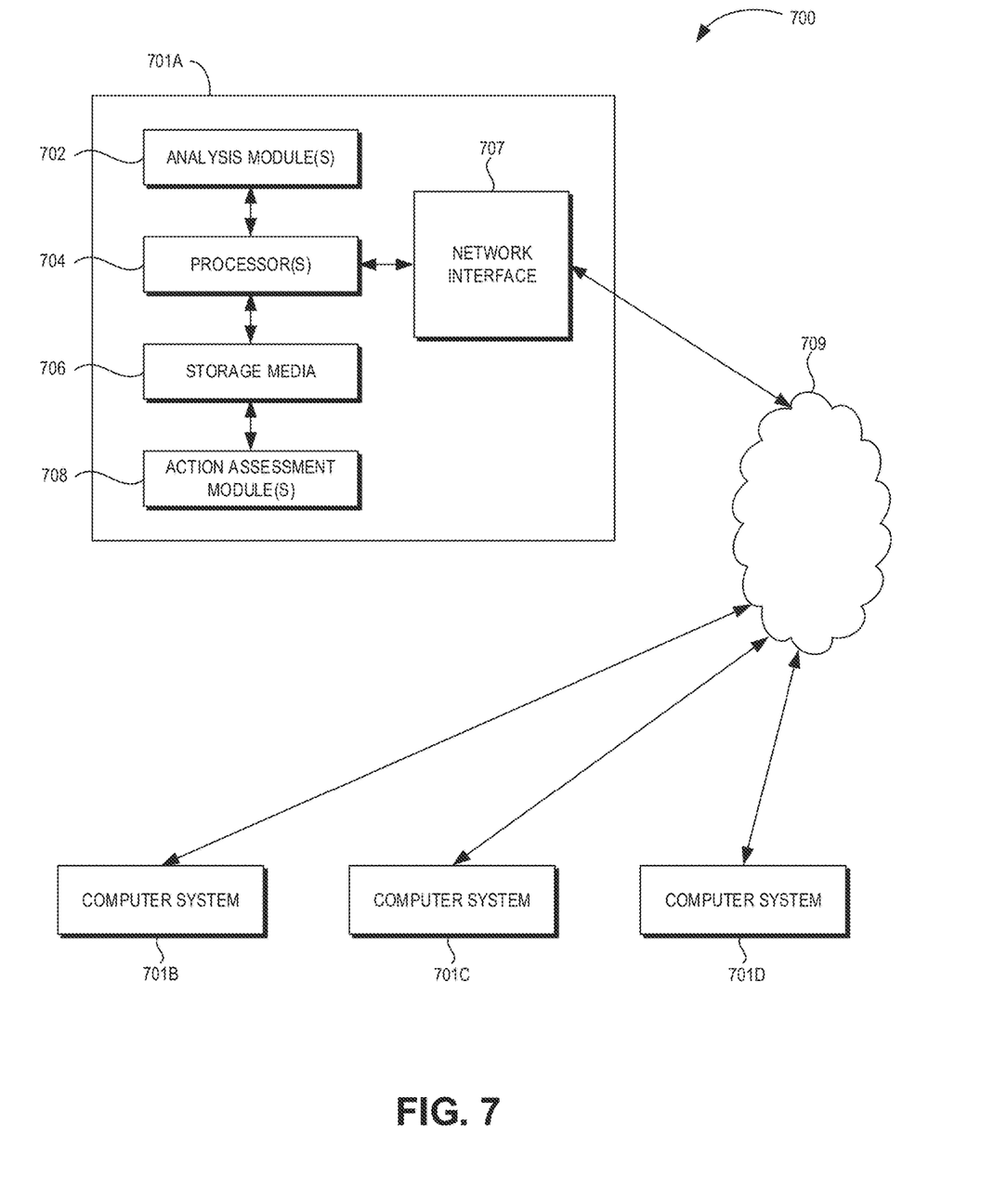
FIG. 7 illustrates an example of a computing system for performing one or more of the methods disclosed herein, in accordance with some embodiments.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more action assessment module(s) 708. In the example of computing system 700, computer system 701A includes the action assessment module 708. In some embodiments, a single action assessment module may be used to perform some aspects of one or more embodiments of the methods disclosed herein. In other embodiments, a plurality of action assessment modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method for drilling a well, comprising:
obtaining an observable from a working environment, wherein the working environment comprises an algorithmic component in a reinforcement learning framework, wherein the working environment further comprises a representation of current drilling operations of a well;
generating, by a plurality of working agents in the working environment, a plurality of proposed drilling actions for the well in response to the observable;
synchronizing a plurality of validation agents in a validation environment with the plurality of working agents in the working environment, wherein the validation environment initially represents the working environment;
simulating, for the well, drilling responses to the proposed drilling actions using a plurality of validation agents in the validation environment, wherein the simulating comprises performing multiple simulations, for each of a plurality of priorities, for each of the plurality of proposed drilling actions, wherein the plurality of priorities comprise: drilling efficiency, drilling speed, risk of failure, and planned trajectory adherence;
determining rewards for each of the plurality of proposed drilling actions based on the simulating, using the validation agents;
selecting one of the plurality of proposed drilling actions based on the rewards;
providing the selected one of the plurality of actions to the working environment; and
causing a drilling rig to execute the selected one of the proposed actions.

2. The method of claim 1, wherein generating the plurality of proposed drilling actions comprises receiving an override action from a human user, and wherein selecting the one of the proposed actions comprises selecting the override action in response to receiving the override action.

3. The method of claim 1, wherein generating the plurality of proposed drilling actions comprises receiving a manual proposed drilling action from a human user, wherein simulating the drilling responses comprises simulating a drilling response to the manual proposed drilling action, wherein determining the rewards comprises determining a reward for the manual proposed drilling action, and wherein selecting one of the proposed actions comprises selecting only the manual proposed drilling action, based on the rewards.

4. The method of claim 1, further comprising receiving a modification to the validation environment from a human user, wherein simulating the drilling responses comprises modifying the validation environment based on the modification received from the human user.

5. The method of claim 4, wherein the modification comprises at least one of a modified geological property for at least a portion of a rock formation through which the well extends.

6. The method of claim 1, wherein respective working agents are trained for different goals, or trained for different drilling environments, or both.

7. The method of claim 1, wherein a first one of the working agents is configured to make a rules-based selection of a drilling action, and wherein another of the working agents is configured to select a drilling action using on a machine-learning model.

8. The method of claim 1, wherein determining the rewards comprises:
for each of the proposed drilling actions:
simulating a drilling scenario for a remainder of a drilling process starting with proposed drilling action; and
determining a reward for the proposed drilling action based on the drilling scenario.

9. A non-transitory computer-readable medium storing instructions that, when executed by at least one processor of a computing system, cause the computing system to perform operations, the operations comprising:
obtaining an observable from a working environment, wherein the working environment comprises an algorithmic component in a reinforcement learning framework, wherein the working environment further comprises a representation of current drilling operations of a well;
generating, by a plurality of working agents in the working environment, a plurality of proposed drilling actions for the well in response to the observable;
synchronizing a plurality of validation agents in a validation environment with the plurality of working agents in the working environment, wherein the validation environment initially represents the working environment;
simulating, for the well, drilling responses to the proposed drilling actions using a plurality of validation agents in the validation environment, wherein the simulating comprises performing multiple simulations, for each of a plurality of priorities, for each of the plurality of proposed drilling actions, wherein the plurality of priorities comprise: drilling efficiency, drilling speed, risk of failure, and planned trajectory adherence;
determining rewards for each of the plurality of proposed drilling actions based on the simulating, using the validation agents;
selecting one of the plurality of proposed drilling actions based on the rewards;
providing the selected one of the plurality of actions to the working environment; and
causing a drilling rig to execute the selected one of the proposed actions.

10. The medium of claim 9, wherein generating the plurality of proposed drilling actions comprises receiving an override action from a human user, and wherein selecting the one of the proposed actions comprises selecting the override action in response to receiving the override action.

11. The medium of claim 9, wherein generating the plurality of proposed drilling actions comprises receiving a manual proposed drilling action from a human user, wherein simulating the drilling responses comprises simulating a drilling response to the manual proposed drilling action, wherein determining the rewards comprises determining a reward for the manual proposed drilling action, and wherein selecting one of the proposed actions comprises selecting only the manual proposed drilling action, based on the rewards.

12. The medium of claim 9, wherein the operations further comprise receiving a modification to the validation environment from a human user, wherein simulating the drilling responses comprises modifying the validation environment based on the modification received from the human user.

13. The medium of claim 12, wherein the modification comprises at least one of a modified geological property for at least a portion of a rock formation through which the well extends.

14. The medium of claim 9, wherein respective working agents are trained for different goals, or trained for different drilling environments, or both.

15. The medium of claim 9, wherein a first one of the working agents is configured to make a rules-based selection of a drilling action, and wherein another of the working agents is configured to select a drilling action using on a machine-learning model.

16. The medium of claim 9, wherein determining the rewards comprises:
for each of the proposed drilling actions:
simulating a drilling scenario for a remainder of a drilling process starting with proposed drilling action; and
determining a reward for the proposed drilling action based on the drilling scenario.

17. A computing system, comprising:
one or more processors; and
a memory system including one or more non-transitory computer-readable media storing instructions that, when executed by at least one of the one or more processors, cause the computing system to perform operations, the operations comprising:
obtaining an observable from a working environment, wherein the working environment comprises an algorithmic component in a reinforcement learning framework, wherein the working environment further comprises a representation of current drilling operations of a well;
generating, by a plurality of working agents in the working environment, a plurality of proposed drilling actions for the well in response to the observable;
synchronizing a plurality of validation agents in a validation environment with the plurality of working agents in the working environment, wherein the validation environment initially represents the working environment;
receiving a manual proposed drilling action from a human user;
simulating, for the well, drilling responses to the proposed drilling actions and the manual proposed drilling action using a plurality of validation agents in the validation environment, wherein the simulating comprises performing multiple simulations, for each of a plurality of priorities, for each of the plurality of proposed drilling actions, wherein the plurality of priorities comprise: drilling efficiency, drilling speed, risk of failure, and planned trajectory adherence;
determining rewards for each of the plurality of proposed drilling actions and the manual proposed drilling action based on the simulating, using the validation agents;
selecting one of the plurality of proposed drilling actions or the manual proposed drilling action, selecting the one of the proposed actions is based on the rewards for the proposed actions;
providing the selected one of the plurality of actions to the working environment; and
causing a drilling rig to execute the selected one of the proposed actions.

18. The medium of claim 9, wherein the operations further comprise receiving a modification to the validation environment from a human user, wherein simulating the drilling responses comprises modifying the validation environment based on the modification received from the human user, wherein the modification comprises at least one of a modified geological property for at least a portion of a rock formation through which the well extends.

19. The method of claim 1, wherein the simulating provides a new observable, the method further comprising:
executing, by the plurality of validation agents, action decisions on the new observable in the validation environment; and
repeating, by the plurality of validation agents, the simulating and the executing until the validation environment reaches a target location.

20. The medium of claim 9, wherein the simulating provides a new observable, and wherein the operations further comprise:
  executing, by the plurality of validation agents, action decisions on the new observable in the validation environment; and
  repeating, by the plurality of validation agents, the simulating and the executing until the validation environment reaches a target location.

21. The system of claim 17, wherein the simulating provides a new observable, and wherein the operations further comprise:
  executing, by the plurality of validation agents, action decisions on the new observable in the validation environment; and
  repeating, by the plurality of validation agents, the simulating and the executing until the validation environment reaches a target location.

\* \* \* \* \*